UNITED STATES PATENT OFFICE 2,675,346

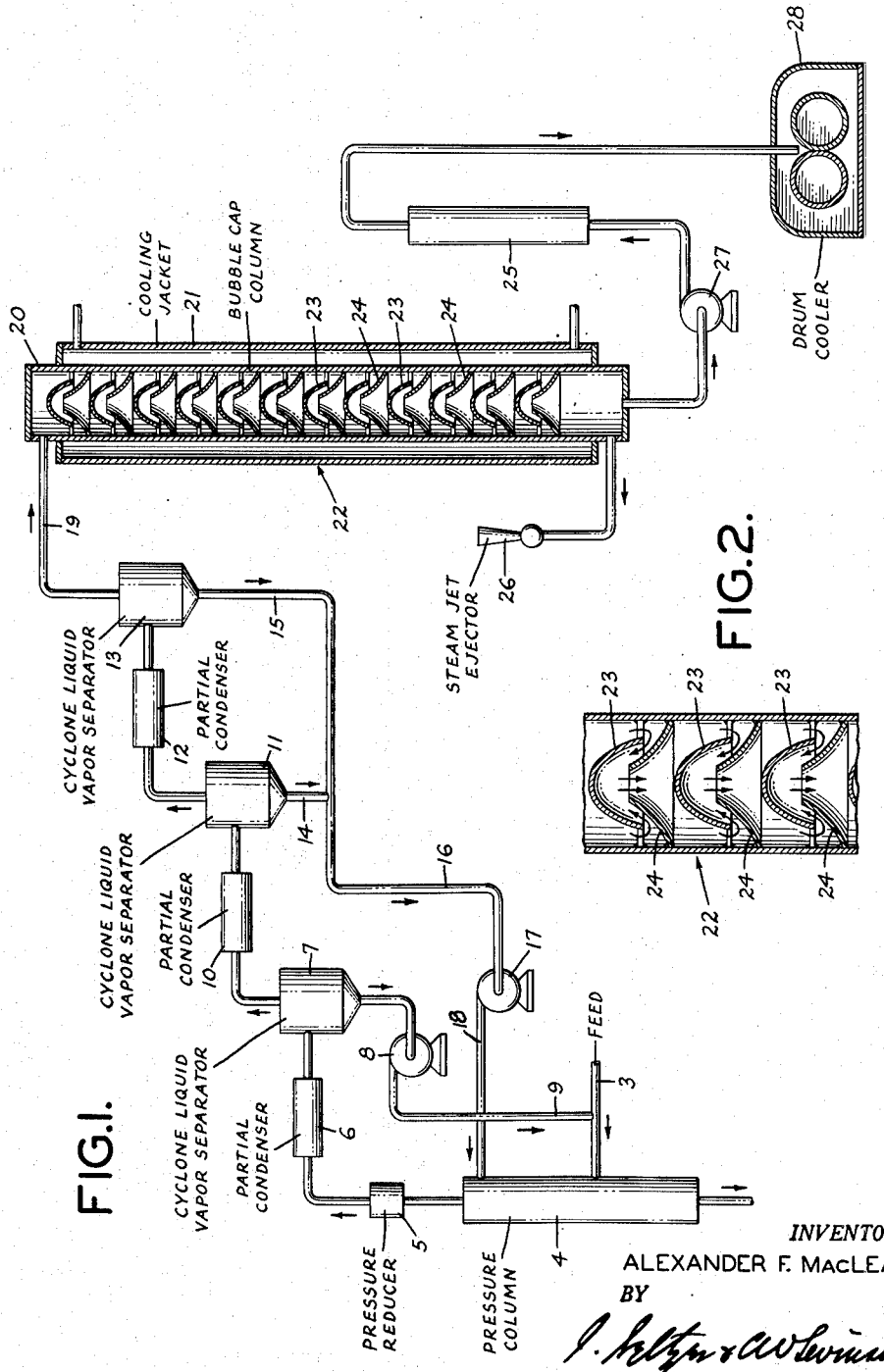

CONCENTRATION OF FORMALDEHYDE BY DISTILLATION AND FRACTIONAL CONDENSATION

Alexander F. MacLean, Robstown, Tex., assignor to Celanese Corporation of America, New York, N. Y., a corporation of Delaware Application November 4, 1949, Serial No. 125,600

6 Claims. (Cl. 202—69)

This invention relates to the concentration of aqueous solutions of formaldehyde, and relates more particularly to the concentration of aqueous formaldehyde solutions by partial condensation reactions and to the production of paraformaldehyde from the concentrated formaldehyde solutions thus obtained.

An object of this invention is the provision of an improved process for the concentration of aqueous solutions of formaldehyde.

Another object of this invention is the provision of a continuous process for the concentration of aqueous solutions of formaldehyde whereby concentrated formaldehyde capable of yielding paraformaldehyde on cooling may be obtained.

A further object of this invention is the provision of a condenser of improved design in which the total condensation of concentrated aqueous solutions of formaldehyde may be effected without plugging and like faults due to the deposition of paraformaldehyde therein.

Other objects of this invention will appear from the following detailed description and the accompanying drawing.

In the drawing,

Fig. 1 is a diagrammatic showing of the manner in which the novel process of my invention may be carried out, and Fig. 2 is a detail view of a condenser tray or element, a plurality of which, when suitably assembled, comprise the novel condenser, or bubble cap column, of my invention.

Like reference numerals indicate like parts throughout both views of the drawing.

Paraformaldehyde is a solid or semi-solid mixture of formaldehyde polymers associated with varying amounts of water. When paraformaldehyde is dissolved in water a depolymerization takes place and aqueous formaldehyde solutions of any desired concentration may be readily obtained. Paraformaldehyde may be produced by evaporating aqueous formaldehyde solutions under vacuum. As the water is removed, the formaldehyde undergoes a polymerization and, upon cooling, paraformaldehyde separates. The average degree of polymerization of paraformaldehyde varies with the conditions employed for the production of the polymer. The production of paraformaldehyde of an excessively high degree of polymerization is undesirable since highly polymerized paraformaldehyde is not easily and quickly dissolved in water. Paraformaldehyde of too low a degree of polymerization is also undesirable in that it is quite soft and difficult to handle and, furthermore, is of a relatively low formaldehyde content. A continuous process for the concentration of formaldehyde and the production therefrom of paraformaldehyde of a controlled average degree of polymerization has long been sought by the art.

I have now found that aqueous formaldehyde solutions may be continuously concentrated and the concentrated formaldehyde solutions thus obtained treated to yield paraformaldehyde of a substantially uniform and controlled degree of polymerization if the said aqueous formaldehyde solutions are concentrated in the vapor phase by means of a plurality of partial condensations, effected in series, and the concentrated formaldehyde vapors obtained totally condensed and the condensate cooled so that paraformaldehyde is produced therefrom.

Thus, in accordance with my novel process, relatively dilute aqueous solutions of formaldehyde from any suitable source, such as the oxidation of methanol or the oxidation of hydrocarbons, containing from about 10 to about 30% by weight of formaldehyde are distilled under a pressure of about 30 to 45 pounds per square inch gage with the liquid phase being at a temperature of 110 to 140° C., the distilled vapors are passed through a pressure reducer where the pressure is brought down to about 5 to 15 pounds per square inch absolute, and the vapors then subjected to a plurality of partial condensations. The initial partial condensation is effected so as to condense about 30 to 50% of the vapors. The vapors may then be conveniently separated from the condensate by means of a suitable cyclone separator and the condensate, which is at a temperature of 72 to 100° C. and which may contain 5 to 15% by weight of formaldehyde, returned to the system. The uncondensed vapors are subjected to a second partial condensation during which about 20 to 30% of the vapors remaining are partially condensed. After this condensate, which is at a temperature of 70 to 95° C., is separated from the uncondensed vapors in a second cyclone separator, the vapors remaining are subjected to a third partial condensation. After separation of the condensate which is at a temperature of 50 to 80° C., the remaining vapors are completely condensed to yield an aqueous formaldehyde solution containing from about 60 to 85% by weight of formaldehyde. This latter condensate may then be converted to paraformaldehyde by cooling. The condensates in the partial condensers preferably have a residence time in said apparatus of less than about one second.

The condensate obtained from the first partial condenser during the initial partial condensation and comprising a dilute aqueous solution of formaldehyde containing 5 to 20% by weight of formaldehyde is pumped back to the pressure column in which the initial distillation is effected together with the incoming raw formaldehyde feed. The condensates from the second and third partial condensations are combined and are preferably returned to the system so as to constitute the reflux to the pressure column. The pressure tower in which the initial distillation is effected discharges, as residue, water containing less than 1% by weight of formaldehyde which is then discarded. Higher boiling impurities, such as hydroxy acetone or glycols are also discharged from the pressure tower. Not only does my novel process yield concentrated formaldehyde of a high degree of purity but by effecting the partial condensation in a plurality of steps in series, a higher yield of purified formaldehyde is obtained than when the partial condensation is carried out in a single step.

In order further to illustrate my invention the following example is given:

Example

Referring now to Fig. 1 of the drawing, the dilute raw aqueous formaldehyde solution to be concentrated is introduced through a feed line 3 into a pressure column 4 in the form of a 12.2% by weight aqueous solution. The raw aqueous formaldehyde solution is entered at a rate of 99.0 parts by weight per hour. The pressure column 4 in which the initial distillation takes place operates under a pressure of 30 to 40 pounds per square inch gage and a temperature of 130 to 140° C. The vapors from pressure column 4 pass through a pressure reducer 5 where the pressure is dropped to about 10 pounds per square inch and the vapors then passed through a partial condenser 6. 32.2% by weight of the vapors is condensed in partial condenser 6 and, after separation of the vapor from the liquid condensate in a cyclone separator 7, the condensate, comprising 30.1 parts by weight per hour of a 8.1% by weight aqueous solution of formaldehyde, is returned to pressure column 4 by means of a pump 8 and a line 9 which joins line 3 through which the raw formaldehyde feed is introduced. The uncondensed vapor, in an amount of 63.6 parts by weight per hour of a 30.7% by weight aqueous solution of formaldehyde, is then passed through a second partial condenser 10 where a further partial condensation of 28.1% of the initial vapors is effected. The condensate is removed from the mixture of condensate and vapor in a cyclone separator 11, the uncondensed vapor being passed to a third partial condenser 12 in which the final partial condensation takes place. The uncondensed vapor remaining is separated from the condensate by means of a cyclone separator 13. The vapor leaving separator 13 comprises 14.9 parts by weight per hour of an 80.5% by weight aqueous solution of formaldehyde. The condensate remaining in separators 11 and 13 is returned to pressure column 4 through lines 14 and 15 which unite in a line 16 and feed the condensate, comprising 48.7 parts by weight per hour of a 15.6% by weight aqueous formaldehyde solution, to a pump 17. The latter forces the condensate back to pressure column 4 through a line 18. The recycled condensate acts as reflux in the pressure column.

The concentrated formaldehyde vapor, comprising about 14.9 parts by weight per hour leaves separator 13, passes through a line 19 into a total condenser 20 of novel design. Condenser 20 is cooled by means of water or other cooling means circulating through a jacket 21. Condenser 20 comprises a plurality of superimposed trays which are generally indicated by reference numeral 22. Trays 22 each comprise a bubble cap 23 provided with a downcomer 24, the design being such that both the liquid and vapor flow are in the same downward direction as shown by the arrows in Fig. 2. Total condensation is effected in condenser 20 and an 80.5% by weight solution of formaldehyde is obtained. The vapor flow through the system of partial condensers, cyclone separators and the total condenser 20 is maintained by means of a steam jet 26, the pressure maintained in said system being at about 10 to about 15 pounds per square inch absolute. The rapid passage of the condensing vapor and condensate through my novel condenser limits the residence time of the concentrated formaldehyde solution in the condenser so that a residence time of about 2 to not more than about 10 minutes and a condensate temperature of about 80 to 100° C. is achieved and precipitation of paraformaldehyde is thereby effectively avoided. A pump 27 passes the condensate from condenser 20 to a soaking vessel 25 wherein the concentrated aqueous formaldehyde is allowed to remain at a temperature of 100 to 130° C. for about 10 to 60 minutes prior to being cooled and solidified. The concentrated aqueous formaldehyde from vessel 25 is then passed to a drum cooler 28 where the solution is cooled on the surface of the drum and the paraformaldehyde which precipitates scraped therefrom in the form of flakes.

My novel process is a continuous one and enables paraformaldehyde of a substantially uniform degree of polymerization and formaldehyde content to be readily obtained.

It is to be understood that the foregoing detailed description is given merely by way of illustration and that many variations may be made therein without departing from the spirit of my invention.

Having described my invention, what I desire to secure by Letters Patent is:

1. Process for the production of paraformaldehyde, which comprises subjecting a dilute aqueous solution of formaldehyde to distillation under a pressure of about 30 to 45 pounds per square inch gage, reducing the pressure on the vapor distillate to a pressure of about 5 to 15 pounds per square inch absolute, passing the vapors through a plurality of cooling zones in each of which a partial condensation of the vapor takes place, removing the condensed liquid from each zone rapidly so that the residence time of the condensed liquid in the cooling zone is less than about one second, the total amount of liquid so condensed being at least about 70% of the vapors from the initial pressure distillation, returning the condensate from the initial condensation to the pressure distillation together with the incoming dilute aqueous formaldehyde feed, returning the combined condensate from the remaining partial condensation to the pressure distillation as reflux, totally condensing the vapors remaining after the final partial condensation, and cooling the condensate.

2. Process for the production of paraformaldehyde, which comprises subjecting a dilute aqueous solution of formaldehyde to distillation under a pressure of about 30 to 45 pounds per square inch gage, reducing the pressure on the vapor distillate to a pressure of about 5 to 15 pounds per square inch absolute, concentrating the vapors by subjecting the same to a plurality of partial condensations, whereby about 30 to 50% by weight of the vapors are condensed during the initial partial condensation, about 20 to 40% by weight condensed during a second partial condensation and about 10 to 30% by weight condensed during the final partial condensation, returning the condensate from the initial condensation to the pressure distillation together with the incoming dilute aqueous formaldehyde feed, returning the combined condensate from the remaining partial condensations to the pressure distillation as reflux, totally condensing the vapors remaining after the final partial condensation, and cooling the condensate.

3. Process for the production of paraformaldehyde, which comprises subjecting a dilute aqueous solution of formaldehyde to distillation under a pressure of about 30 to 45 pounds per square inch gage, reducing the pressure on the vapor distillate to a pressure of about 5 to 15 pounds per square inch absolute, concentrating the vapors by subjecting the same to a plurality of partial condensations, whereby about 30 to 50% by weight of the vapors are condensed during the initial partial condensation, about 20 to 40% by weight condensed during a second partial condensation and about 10 to 30% by weight condensed during the final partial condensation, returning the condensate from the second and final condensations to the pressure distillation as reflux, totally condensing the vapors remaining after the final partial condensation, allowing the condensate to soak at about 100 to 120° C. for 10 to 60 minutes and then cooling the condensate to yield paraformaldehyde.

4. Process for the concentration of formaldehyde, which comprises subjecting a dilute aqueous solution of formaldehyde to distillation under a pressure of about 30 to 45 pounds per square inch gage, reducing the pressure on the vapor distillate to a pressure of about 5 to 15 pounds per square inch absolute, passing the vapors through a plurality of cooling zones in each of which a partial condensation of the vapor takes place, removing the condensed liquid from each zone rapidly so that the residence time of the condensed liquid in the cooling zone is less than about one second, the total amount of liquid so condensed being at least about 70% of the vapors from the initial pressure distillation, returning the condensate from the initial condensation to the pressure distillation together with the incoming dilute aqueous formaldehyde feed, returning the combined condensate from the remaining partial condensation to the pressure distillation as reflux, and totally condensing the vapors remaining after the final partial condensation.

5. Process for the concentration of formaldehyde, which comprises subjecting a dilute aqueous solution of formaldehyde to distillation under a pressure of about 30 to 45 pounds per square inch gage, reducing the pressure on the vapor distillate to a pressure of about 5 to 15 pounds per square inch, concentrating the vapors by subjecting the same to a plurality of partial condensations, whereby about 30 to 50% by weight of the vapors are condensed during the initial partial condensation, about 20 to 40% by weight condensed during a second partial condensation and about 10 to 30% by weight condensed during the final partial condensation, returning the condensate from the initial condensation to the pressure distillation together with the incoming dilute aqueous formaldehyde feed, returning the combined condensate from the remaining partial condensations to the pressure distillation as reflux, and totally condensing the vapors remaining after the final partial condensation.

6. Process for the concentration of formaldehyde, which comprises subjecting a dilute aqueous solution of formaldehyde to distillation under a pressure of about 30 to 45 pounds per square inch gage, reducing the pressure on the vapor distillate to a pressure of about 5 to 10 pounds per square inch absolute, concentrating the vapors by subjecting the same to a plurality of partial condensations, whereby about 30 to 50% by weight of the vapors are condensed during the initial partial condensation, about 20 to 40% by weight condensed during a second partial condensation and about 10 to 30% by weight condensed during the final partial condensation, returning the condensate from the second and final condensations to the pressure distillation as reflux, and totally condensing the vapors remaining after the final partial condensation.

References Cited in the file of this patent

UNITED STATES PATENTS

| Number | Name | Date |
|---|---|---|
| 1,871,019 | Walker | Aug. 9, 1932 |
| 1,905,033 | Bond | Apr. 28, 1933 |
| 2,257,780 | Bludworth | Oct. 7, 1941 |
| 2,411,436 | Kopp | Nov. 19, 1946 |
| 2,425,669 | Brock | Aug. 12, 1947 |
| 2,432,405 | Gerhold | Dec. 9, 1947 |
| 2,498,206 | Greenwald et al. | Feb. 21, 1950 |
| 2,527,655 | Pyle et al. | Oct. 31, 1950 |
| 2,529,622 | Michael | Nov. 14, 1950 |

FOREIGN PATENTS

| Number | Country | Date |
|---|---|---|
| 503,180 | Germany | July 24, 1930 |
| 479,255 | Great Britain | Feb. 2, 1938 |

OTHER REFERENCES

Industrial and Engineering Chemistry, July 1940, vol. 32, No. 7, pages 1016–1018.

Industrial and Engineering Chemistry, April 1948, vol. 40, No. 4, pages 661–672.

"Formaldehyde," Walker, (c) 1944 by Reinhold Publishing Corp., New York, New York, pages 58 to 63.